Patented Nov. 24, 1925.

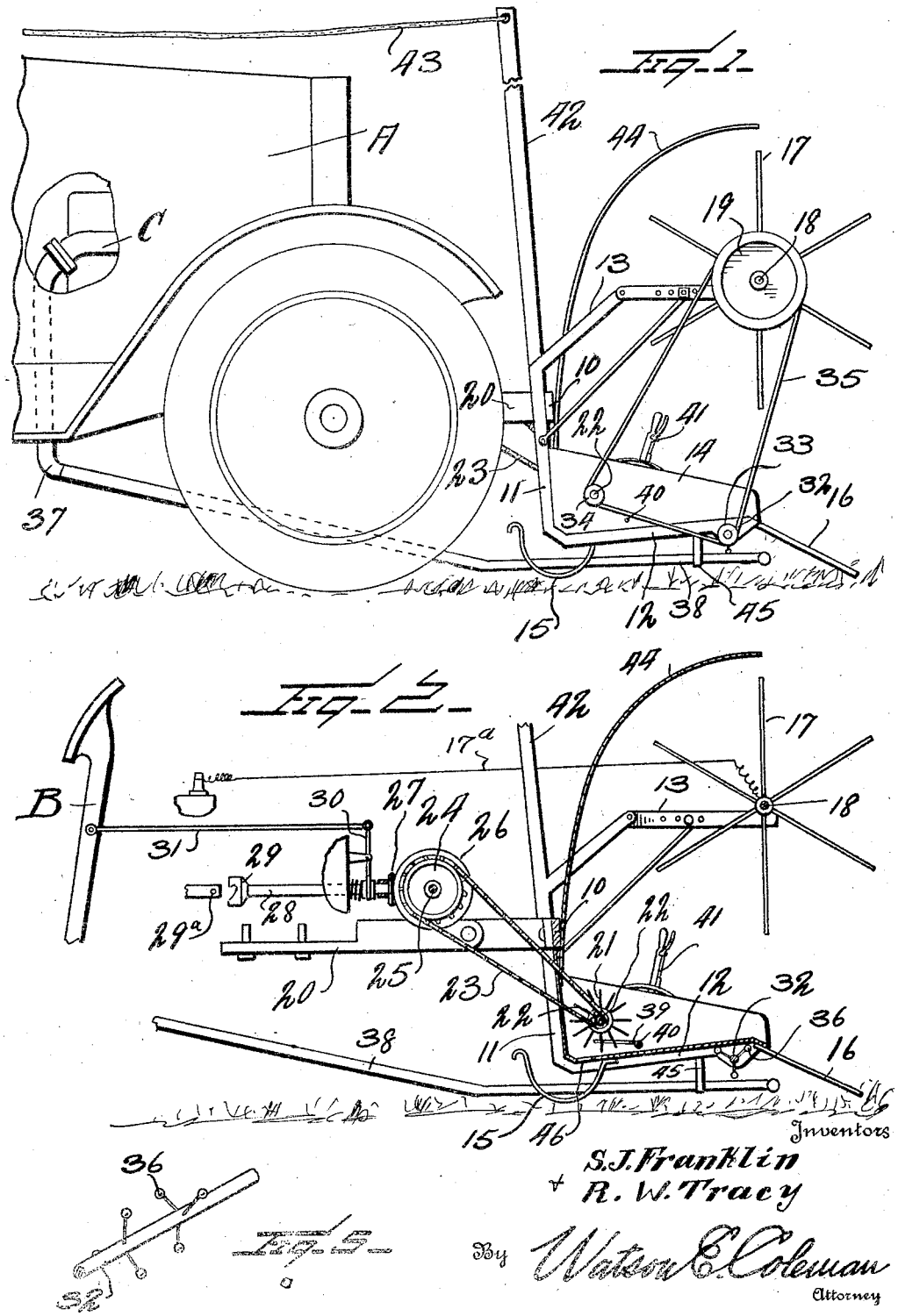

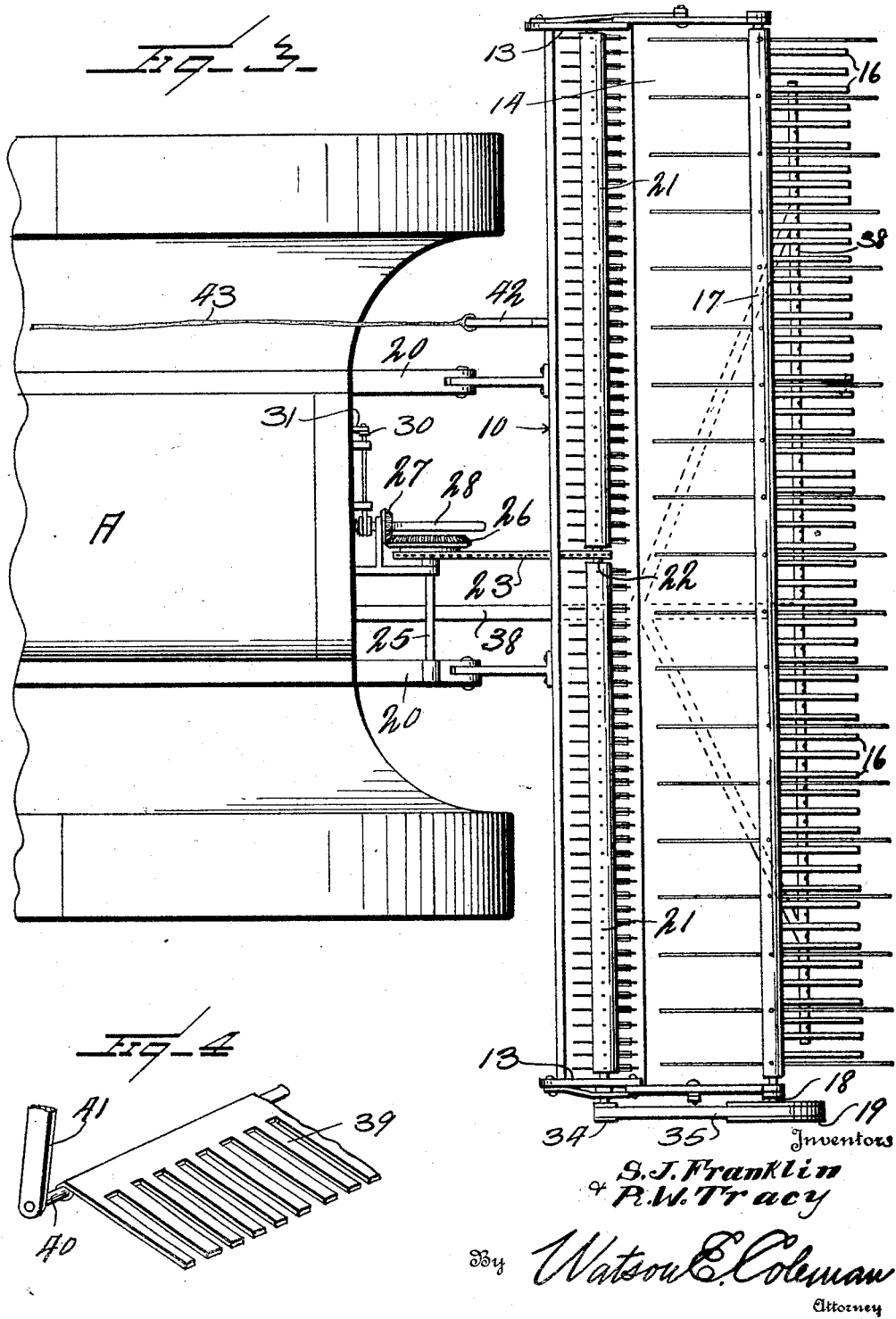

1,562,627

UNITED STATES PATENT OFFICE.

SIR J. FRANKLIN, OF BEAVER CITY, NEBRASKA, AND ROY W. TRACY, OF BREWSTER, KANSAS.

INSECT-KILLING ATTACHMENT FOR AUTOMOBILES.

Application filed December 23, 1924. Serial No. 757,680.

*To all whom it may concern:*

Be it known that we, SIR J. FRANKLIN, a citizen of the United States, residing at Beaver City, in the county of Furnas and State of Nebraska, and ROY W. TRACY, a citizen of the United States, residing at Brewster, in the county of Thomas and State of Kansas, have invented certain new and useful Improvements in Insect-Killing Attachments for Automobiles, of which the following is a specification, reference being had to the accompanying drawings.

This invention relates to insect killing devices, and particularly to an attachment designed to be used in connection with an automobile or tractor and disposed in front thereof whereby insects, such as grasshoppers which live in grass and low bushes, may be killed as the automobile proceeds across a field.

One of the objects of the invention is to provide an attachment adapted to be applied in front of a vehicle and mounted thereon, having therein a beater or other like means, and an insect killing device which is driven by the vehicle, the beater acting to knock the insects into the pan of the attachment and to kill the insects by contact with the beater.

A further object is to provide an attachment of this character which is adjustable as to height and which may be thrown into or out of gear with the driving mechanism of the automobile.

A still further object is to provide an attachment of this character having means whereby the exhaust of the engine may be discharged in front of the pan of the attachment to thereby scare the insects and to suffocate them with the fumes of the exhaust.

Another object is to provide means whereby a noise may be made to scare up the insects and cause them to rise upward so that they will be struck by the beater and knocked into the pan or cause them to rise directly into the pan.

Other objects have to do with the details of construction and arrangement of parts as will appear more fully hereinafter.

Our invention is illustrated in the accompanying drawings, wherein:—

Figure 1 is a side elevation of the forward end of an automobile showing our insect killing attachment applied thereto;

Figure 2 is a vertical sectional view through the attachment;

Figure 3 is a top plan view of the structure shown in Figure 1;

Figure 4 is a fragmentary view of the concave 39 and the lever whereby the concave is adjusted;

Figure 5 is a fragmentary view of the cam 32 and the clappers.

Referring to these drawings, it will be seen that our attachment comprises a supporting frame, designated generally 10, which extends upward at the rear end, as at 11, and at the lower end thereof extends upward and forward, as at 12. The upper portion of the supporting frame extends upward and forward, as at 13. Mounted within the supporting frame is a pan 14, and runners 15 are provided at the rear end of the supporting frame which are adapted to rest upon the ground if the supporting frame should drop to this position. The forward end of the pan has forwardly projecting fingers 16.

Mounted in the upwardly and forwardly projecting portions 13 of the supporting frame is a reel 17 having a shaft 18, which shaft carries a pulley 19. The reel is preferably composed of radially directed pins either formed of wood or wire whose function is to sweep the upper portion of the grass and strike the grasshoppers, beetles or other insects rearward into the pan or to strike grasshoppers or other insects which rise up from the grass into the path of movement of the reel. The supporting frame is mounted upon the machine by means of supporting bars 20 which are bolted or otherwise attached to the forward end of the automobile A in any suitable manner.

Disposed at the rear end of the pan and coacting with a concave, as will be later described, is a beater 21 having radially projecting wires like brush bristles, and the shaft of this beater carries upon it a pulley 22. This is driven by a band or sprocket chain 23 which extends upward and rearward and engages around a pulley or sprocket wheel 24 mounted upon a shaft 25. This shaft carries upon it the beveled gear wheel 26, which in turn engages a beveled gear wheel 27 mounted loosely upon a shaft 28 which is disposed in advance of the drive shaft of the engine, this shaft 28 carrying upon it a clutch 29 operated by means of a clutch-shifting arm 30, in turn operated by a longitudinally extending rod 31 connecting with the clutch pedal B of the automobile. The clutch face 29 engages the pin 29ª on the drive shaft of the engine in an obvious manner, a spring normally holding the shaft 28 from its engagement with this clutch pin 29ª.

Mounted in the forward end of the pan and extending transversely across the machine is a cam shaft 32 having thereon a pulley 33. Passing over this pulley 33 and around a pulley 34 mounted on one end of the beater shaft and around the pulley 19 is a band 35 whereby these various instrumentalities are driven from the beater shaft. The cam 32 operates clappers 36 which beat against the bottom of the pan 14 as the attachment is pushed forward to thereby scare up insects in front of the pan. Connected to the exhaust pipe C of the machine is a hose 37 which extends downward and forward and discharges into a plurality of branches 38, which in turn discharge into a transverse perforated pipe 38ª, discharging beneath the forward edge of the pan and beneath the fingers 16. The purpose of thus discharging the exhaust is to stupefy the insects in advance of the attachment and further to scare them so that they will rise.

Disposed in conjunction with the cylinder or beater 21 is a comb-like concave 39 which is pivotally mounted, as at 40, and which is raised or lowered toward or from the cylinder 21 by means of a lever 41 mounted upon the end of the pan. This concave has teeth which are disposed to one side of the path of movement of the teeth on the cylinder or beater 21 so that the teeth of the beater pass through the teeth of the concave.

Preferably the portion 13 of the frame is made adjustable so as to raise or lower the beater and thus conform to the height of the grass or other vegetation through which the device is passed. An adjusting lever 42 is connected to the frame whereby the frame may be tilted to raise or lower the fingers 16, the upper end of this adjusting lever having a cord 43 which extends backward into the car and is within the control of the operator.

It will be understood that the reel may be formed of either wooden or wire spikes, the reel acting to knock the insects down into the pan. These metallic spikes 17 may be charged with electricity by means of a wire 17ª leading to the magneto post of the engine.

Preferably a cover 44 extends from a point above the reel downward and rearward to a point adjacent the back of the pan 12, and preferably this cover will be partly of metal and partly of transparent material such as celluloid. The exhaust pipe will be clamped or otherwise supported from the bottom of the pan 12 by means of a clamp 45 or equivalent device. The bottom of the pan adjacent its rear end is formed with an opening 46 to permit the discharge of the insects which have been killed by the rotating cylinder or beater 21.

This device is intended for use in alfalfa, potatoes, grain and other crops for the purpose of destroying the insects therein. Of course, the car is to be run through these crops at low speed. The pan will be elevated sufficiently above the ground so as not to injure the crop of grass and it is intended that the passage of the attachment over a piece of ground shall cause grasshoppers and other insects to rise upward, be struck by the reel, knocked down into the pan, and there killed by the beater. Obviously the pan may be formed so as to hold liquid such as oil which will prevent the insects from jumping out of the pan. When the clutch pedal B is shifted inward to start the machine forward, it will also throw in the clutch 29 so that when the machine is stopped the revolving parts of the attachment will also stop.

It is intended that the pan with its attached parts shall be supported entirely by the car and shall not ride upon the ground but the runners 15 are provided in case anything should break which would be liable to permit the pan to drop upon the ground. By the use of this device, the insects will rise up because of the noise made by the beaters 36 and by the sound of the exhaust and will be stupefied by the fumes of the exhaust and struck by the wires 17 and will be knocked down into the pan 12. The beater 21 revolves in a clockwise direction so that the insects are carried downward by the beater and crushed against the comb, carried through the comb, and are discharged through the open space 46. The comb may, of course, be shifted toward or from the central solid portion of the beater.

While we have illustrated certain details of construction and arrangement of parts, we do not wish to be limited to these as it is obvious that many changes might be made without departing from the spirit of the invention.

We claim:—

1. An insect killing attachment for motor cars comprising a pan, a cylinder mounted for rotation immediately above the rear end of the pan and having radially projecting teeth, a concave coacting with the cylinder, a reel mounted above and slightly in advance of the pan, means for supporting the pan upon an automobile in advance thereof, and means adapted to be driven by the automobile for rotating the reel and cylinder.

2. An attachment of the character described comprising a supporting frame, a pan carried thereby and having forwardly directed fingers, a cylinder, a concave mounted within the pan, a reel mounted upon the frame above the pan, a shaft mounted upon the supporting frame, means operatively connecting the driving shaft to the reel and the cylinder, and means for vertically adjusting the pan.

3. An insect killing attachment for automobiles comprising a supporting frame adapted to be mounted upon the forward end of an automobile, a pan carried thereby and having forwardly projecting fingers at its forward edge, a reel mounted upon the frame above the pan, a cylinder, a concave mounted within the pan, automobile operated means for driving the reel and the cylinder, and clappers mounted upon the forward edge of the pan and driven with the cylinder and reel.

4. The combination with an automobile, of an insect-catching device mounted upon the forward end thereof and in advance thereof and including a pan extending transversely of the automobile, and means for stupefying and disturbing the insects comprising a perforated discharge pipe extending parallel to and below the forward edge of the pan, and pipes leading from said discharge pipe to the exhaust of the engine.

5. The combination with an automobile, of an insect destroying device mounted upon the forward end and in advance thereof and including a pan, the bottom of the pan at its rear end having a discharge opening, a rotatable beater mounted within the pan and having outwardly projecting teeth, and a concave comprising a comb-like member pivotally mounted in advance of the beater and having its teeth interdigitated with relation to the teeth on the beater.

6. The combination with an automobile, of an insect destroying device mounted upon the forward end and in advance thereof and including a pan, the bottom of the pan at its rear end having a discharge opening, a rotatable beater mounted within the pan and having outwardly projecting teeth, a concave comprising a comb-like member pivotally mounted in advance of the beater and having its teeth interdigitated with erlation to the teeth on the beater, and means whereby the comb may be shifted toward or from the center of the beater.

7. An insect killing attachment for automobiles comprising a pan having a back, bottom and end walls, means for supporting this pan upon an automobile in advance thereof, a reel mounted upon the pan and above the same, a rotatable beater disposed within the pan adjacent the rear thereof, a concave coacting with the beater and mounted within the pan, the bottom of the pan having an opening at its rear end for the discharge of insects and the forward end of the pan having forwardly extending fingers, and means adapted to be connected to the driving shaft of the automobile whereby the beater and concave may be driven.

8. An insect destroying attachment for automobiles comprising a supporting frame adapted to be applied to an automobile at the forward end thereof, a pan supported upon said frame, the pan having a bottom, a rear wall and end walls, the bottom having an opening adjacent the rear wall, a reel having outwardly, radially projecting fingers mounted upon the supporting frame above the pan, a cover extending from a point above the reel downward and rearward to the rear wall of the pan, a beater mounted within the pan and having radially projecting teeth, a concave having teeth and coacting with the beater and adjustable toward or from the center thereof, and exhaust discharge pipes mounted upon the supporting frame and adapted to be clamped to the exhaust pipe of the automobile, the discharge pipes extending forward to the forward edge of the pan and extending laterally the full length of the pan and being perforated.

In testimony whereof we hereunto affix our signatures.

SIR J. FRANKLIN,
ROY W. TRACY.